(12) United States Patent
Hiraga et al.

(10) Patent No.: US 8,682,098 B2
(45) Date of Patent: Mar. 25, 2014

(54) IMAGE DATA PROCESSING METHOD AND IMAGE PROCESSING APPARATUS

(75) Inventors: Masaki Hiraga, Tokyo (JP); Kensuke Habuka, Tokyo (JP)

(73) Assignee: Morpho, Inc., Tokyo (JP)

( * ) Notice: Subject to any disclaimer, the term of this patent is extended or adjusted under 35 U.S.C. 154(b) by 851 days.

(21) Appl. No.: 12/317,602

(22) Filed: Dec. 26, 2008

(65) Prior Publication Data

US 2009/0185721 A1 Jul. 23, 2009

(30) Foreign Application Priority Data

Dec. 29, 2007 (JP) ................................. 2007-341553

(51) Int. Cl.
*G06K 9/40* (2006.01)

(52) U.S. Cl.
USPC ......................................................... 382/275

(58) Field of Classification Search
USPC ......................................... 382/107, 275, 284
See application file for complete search history.

(56) References Cited

U.S. PATENT DOCUMENTS

| | | | | |
|---|---|---|---|---|
| 4,393,394 A * | 7/1983 | McCoy | ........................... | 348/587 |
| 4,979,037 A * | 12/1990 | Mizutani et al. | .......... | 375/240.21 |
| 5,134,478 A * | 7/1992 | Golin | ........................ | 375/240.12 |
| 5,410,356 A * | 4/1995 | Kikuchi et al. | ................ | 348/452 |
| 6,524,252 B1 * | 2/2003 | Yu et al. | ........................ | 600/443 |
| 6,544,177 B1 * | 4/2003 | Robinson | ....................... | 600/443 |
| 6,561,907 B2 * | 5/2003 | Shimizu et al. | ................. | 463/31 |
| 7,277,483 B1 * | 10/2007 | Eckart | ...................... | 375/240.03 |
| 7,319,493 B2 * | 1/2008 | Hata et al. | ...................... | 348/584 |
| 7,430,329 B1 * | 9/2008 | Sarna | .............................. | 382/239 |
| 8,111,300 B2 * | 2/2012 | Hwang et al. | ............... | 348/222.1 |
| 8,189,954 B2 * | 5/2012 | Brosnan | ......................... | 382/275 |
| 8,311,367 B2 * | 11/2012 | Murashita et al. | ............. | 382/294 |
| 2004/0201753 A1 * | 10/2004 | Kondo et al. | .................. | 348/239 |
| 2005/0271300 A1 * | 12/2005 | Pina | .............................. | 382/294 |
| 2006/0103742 A1 * | 5/2006 | Kubo et al. | .................... | 348/241 |
| 2006/0171687 A1 * | 8/2006 | Aiso | .............................. | 386/120 |
| 2007/0139560 A1 | 6/2007 | Zhong | | |
| 2008/0106647 A1 * | 5/2008 | Kimura et al. | ................. | 348/607 |

FOREIGN PATENT DOCUMENTS

| | | |
|---|---|---|
| JP | 09(1997)-261526 | 10/1997 |
| JP | 2003-078807 | 3/2003 |
| JP | 2007-036742 | 2/2007 |
| WO | WO2007/032156 | 3/2007 |

OTHER PUBLICATIONS

Tsuji et al. "A Nonlinear Spatio-Temporal Diffuson and ITS Application to Prefiltering in MPEG-4 Video Coding", IEEE ICIP 2002,I-85-88.

* cited by examiner

*Primary Examiner* — Michelle Entezari

(74) *Attorney, Agent, or Firm* — Muramatsu & Associates

(57) ABSTRACT

An image data processing method for creating a clear blur-compensated image; the method calculates the motion data between a reference image and a target image, calculates difference in pixel value between the reference image and the target image for every block matched by the motion data, calculates, based on the difference in pixel value, the blending ratio between the reference image and the target image for each block, and creates a synthesized image by synthesizing the reference image and the target image according to the motion data and the blending ratio. An image processing apparatus implementing the image data processing method noted above is also disclosed.

3 Claims, 8 Drawing Sheets

Fig. 3
(a)
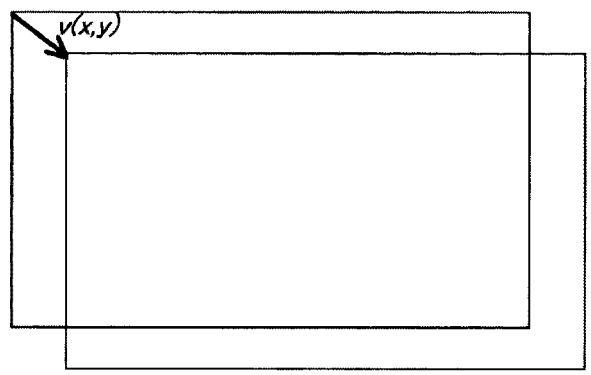
(b)
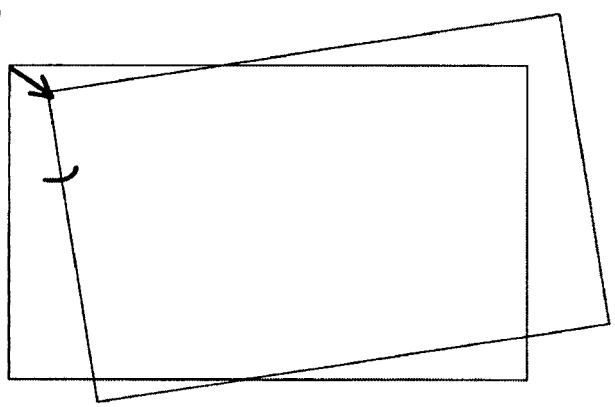
Fig. 4
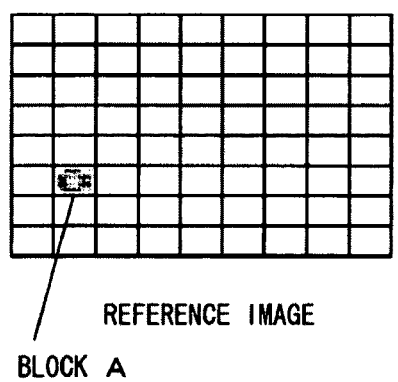
REFERENCE IMAGE
BLOCK A
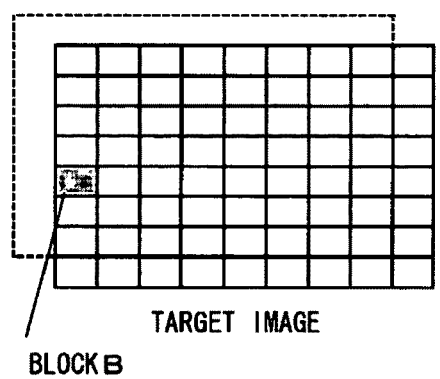
TARGET IMAGE
BLOCK B

IMAGE DATA PROCESSING METHOD AND IMAGE PROCESSING APPARATUS

This application claims the benefits of foreign filing priority based on Japanese Patent Application No. 2007-341553 filed Dec. 29, 2007, the entire contents of which are incorporated herein by reference.

BACKGROUND OF THE INVENTION

1. Field of the Invention

The present invention relates to image data processing method and image processing apparatus for making appropriate corrections to an image blurred due to camera shake, especially for an image with a moving subject, through computer processing of a captured image.

2. Description of the Related Art

There exist blur-compensation technologies developed to prevent blurring of an image due to camera shake. There are various types of blur-compensation technologies including optical correction type and image synthesizing type. Of these technologies, image synthesizing type of blur-compensation is suited for devices, etc. that are required to be compact since the technology does not require a corrective lens or a drive mechanism for its optical device.

In Japanese Unexamined Patent Application Publication Nos. 2003-78807 and 1997-261526, technologies are proposed to compensate for blurring by calculating the motion vector between multiple still images captured by an imaging device such as a camera.

With an image synthesizing type, motion vectors between multiple images are calculated first, and a relative displacement between images is obtained from the motion vectors. Then, a synthesized image is obtained from an addition process utilizing applicable pixel values in the multiple images with their displacement corrected.

However, if there is a moving subject in a captured image, the location of the subject will change between images, and existing image synthesizing type correction creates a synthesized image with a blurry ghost-like subject in the image.

FIG. 8 is an example of a captured image using existing image synthesizing type of blur-compensation. Image (a) through image (d) are consecutively captured input images. It is noticeable that the motorbike, the image's subject, is moving diagonally towards the top right corner of the image.

Image (h) is the corrected and synthesized image created using image (a) through image (d). Among photography subjects in the image (h), the motorbike that is a moving subject that appears like an after-image.

The present invention was made in view of the above issue. The object of this invention is to provide an image data processing method and image processing apparatus where a more accurate blur-compensated image can be obtained by preventing the photographic subject from becoming indistinct even if there is a moving subject in a captured image.

SUMMARY OF THE INVENTION

In order to achieve the object, there is provided according to an aspect of the present invention, an image data processing method including a motion data computation process for calculating the motion data between a reference image and a target image, a block comparison process for calculating difference in pixel value between the reference image and the target image for every block matched by the motion data, a blending ratio calculation process for calculating, based on the difference in pixel value, the blending ratio between the reference image and the target image for each block, and an image synthesizing process for creating a synthesized image by synthesizing the reference image and the target image according to the motion data and the blending ratio.

Here, reference image is defined as an image which will be referenced during motion data computation and image synthesizing process. For the first image synthesizing process, any single image from multiple input images will be selected to be used as reference image. As a selection criterion for a reference image, it could be determined based on having the earliest timestamp in consecutively captured images, or by comparing other parameters. For the second image synthesizing process, the previously synthesized image is used as the reference image.

Also, target images are images other than a reference image among input images which will be used in the image data processing of this invention. A target image is used to calculate motion data with respect to a reference image or is used in the image synthesizing process with a reference image. There can be multiple target images whereby each target image is processed with respect to a reference image.

The present invention obtains a motion data between a reference image and a target image. Motion data indicates the relative displacement between the images, including displacement of the entire images, and the motion of each feature point or each block.

Here, the blending ratio for two images to calculate the pixel value for the synthesized image, is defined as the ratio of pixel values from each image and it includes 0% and 100% for 0, 1 determinations serving as the decision whether to perform blending or not as well as intermediary values between 0% and 100%. Blending ratio is determined per block based on the difference in the pixel values between a reference image and a target image for each block. The effect of a target image on a reference image can be reduced by using a lower blending ratio if a block's pixel value difference is significant. Thus, if there is a moving subject in an image block, then the difference in pixel values between images will be significant, and this process with the lower blending ratio will reduce the impact of the moving subject on a synthesized image.

Preferably, the blending ratio calculation process should correct the once calculated blending ratio based on the blending ratio of neighboring blocks. For example, take any block (say block A) and if its blending ratio is below a predetermined threshold, check whether neighboring blocks have blending ratios that are above the threshold, and if such block(s) exist, then adjust the blending ratio of those neighboring block(s) to be the same as the blending ratio of block A, or reduce the target image blending ratio of those neighboring block(s) according to the number of surrounding blocks with blending ratios that are below the threshold.

This method allows a synthesized image to have sharp edges even on a moving subject.

According to another aspect of the present invention, the image data processing method uses a synthesized image created by the image synthesizing process as a new reference image, then obtains a new target image to perform the motion data computation process, the block comparison process, the blending ratio calculation process, then the image synthesizing process and repeat these processes until there are no more target images to be obtained, or up to a certain number of times, to create the final synthesized image.

The present invention is capable of obtaining a sharper image with less noise by blending multiple images. This is especially true for blocks that are blended numerous times, as that part of the image becomes sharper.

According to another aspect of the present invention, the image data processing method performs noise reduction process, changing the coefficient or method of noise reduction for every block based on the blending ratio.

Noise reduction is a process that smoothes out the random noise in an image. A coefficient can be used to change the noise reduction effect, or the noise reduction method itself can be changed. Examples of noise reduction methods include but are not restricted to median filters and Gaussian filters.

Also, "based on the blending ratio" means "depending on at least a ratio of a reference image and a target image for creating each block of a synthesized image", for example this is determined by the number of images whose blending ratio are above a certain threshold. In this case, the blending ratio can be determined according to the number of images used to create the synthesized image if each image is weighed equally. Therefore, "based on the blending ratio" can include cases where it is based on the number of images used in the synthesizing process.

A natural looking synthesized image with small distribution of noise overall can be obtained by solving the difference in noise levels between images that blend many and few blocks by changing the coefficient or method of noise reduction for each block based on its blending ratio.

According to another aspect of the present invention, an image processing apparatus including a motion data computation unit for calculating the motion data between a reference image and a target image, a block comparison unit for calculating difference in pixel value between the reference image and the target image for every block matched by the motion data, a blending ratio calculation unit for calculating, based on the difference in pixel value, the blending ratio between the reference image and the target image for each block, and an image synthesizing unit for creating a synthesized image by synthesizing the reference image and the target image according to the motion data and the blending ratio.

According to the present invention, sharper blur-compensated images can be obtained by isolating blocks in a captured image containing a moving subject and altering their blending ratio when creating a synthesized image. Also, noise reduction coefficient or method can be changed based on this blending ratio, which will decrease the scattering of noise in a synthesized image and can homogenize image quality.

BRIEF DESCRIPTION OF THE DRAWINGS

FIG. 3 is a diagram describing an example of motion data.

FIG. 4 is a diagram describing corresponding blocks.

DESCRIPTION OF THE PREFERRED EMBODIMENTS

Preferred embodiments in accordance with this invention will be described below.

Figure 1:
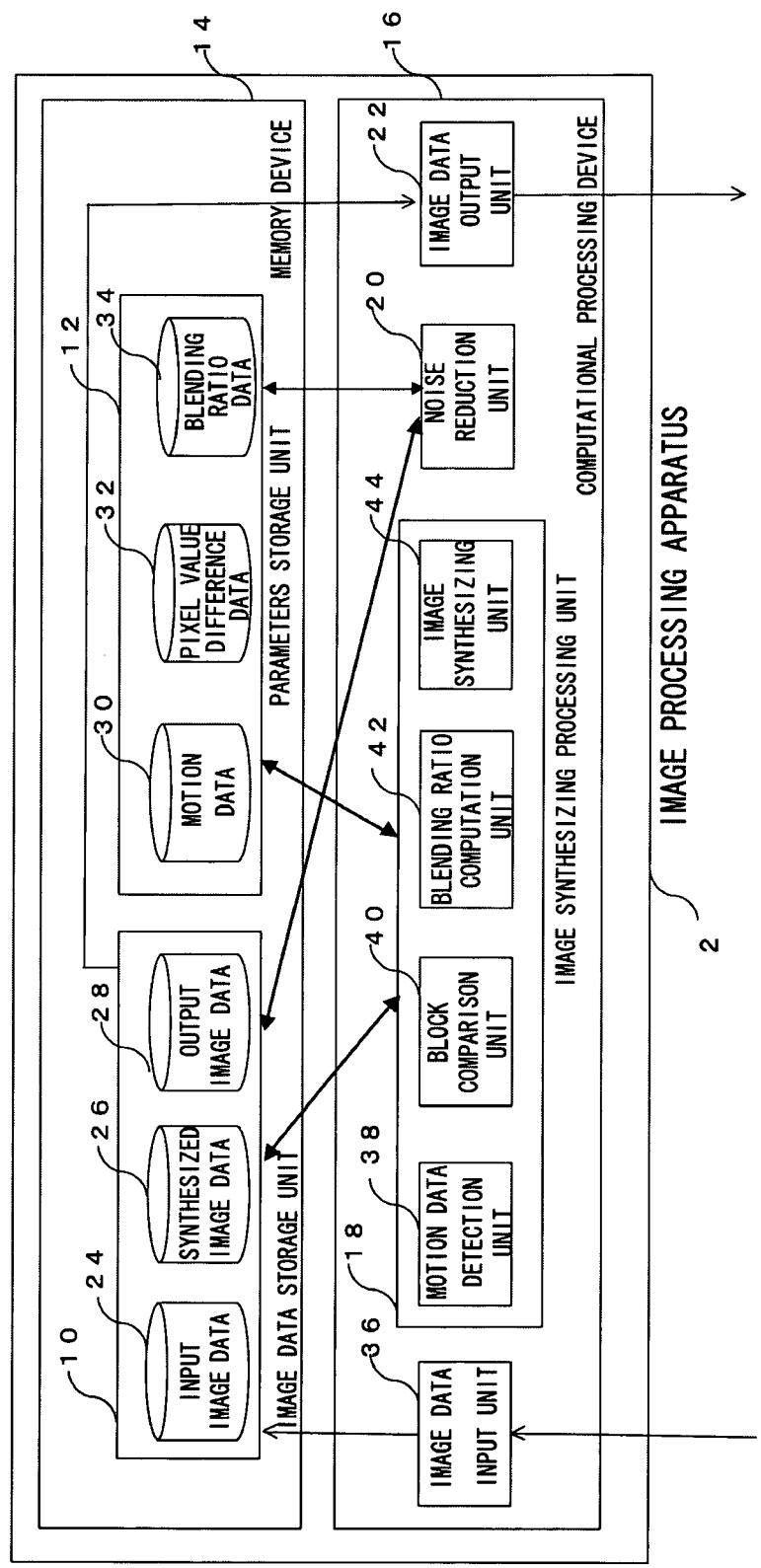
FIG. 1 is a functional block diagram for the image processing apparatus relating to this embodiment of the present invention.

FIG. 1 is a block diagram of image processing apparatus 2 of this embodiment. This apparatus takes multiple images as input, then synthesizes these images together to create a blur-compensated image.

Image processing apparatus 2 includes memory device 14 and computational processing device 16.

Computational processing device 16 includes image data input unit 36, image synthesizing processing unit 18, noise reduction unit 20, and image data output unit 22.

Image data input unit 36 receives image data from an external source and stores it in memory device 14. At this time, image data input unit 36 selects an input image as a reference image for use in image comparison and synthesizing, and stores it as such with the remaining images stored as target images. Image synthesizing processing unit 18 performs the synthesizing of a reference image and a target image. Noise reduction unit 20 applies noise reduction filters to a synthesized image to eliminate noise in a synthesized image. Image data output unit 22 outputs the noise reduced synthesized image as the final output image.

Image synthesizing processing unit 18 includes motion data detection unit 38, block comparison unit 40, blending ratio computation unit 42, and image synthesizing unit 44.

Motion data detection unit 38 computes the motion data between multiple input images. Block comparison unit 40 compares corresponding blocks between a reference image and a target image to compute the pixel value differences for each block. Blending ratio computation unit 42 uses the pixel value differences calculated in block comparison unit 40 to calculate the blending ratio for each block of each target image. Image synthesizing unit 44 uses the calculated motion data and blending ratio data by synthesizing multiple target images together with a reference image to create a synthesized image. Noise reduction unit 20 applies noise reduction filters on a synthesized image to eliminate noise in the synthesized image. Image data output unit 22 outputs the noise reduced synthesized image as the final output image.

Memory device 14 includes image data storage unit 10 and parameters storage unit 12. Image data storage unit 10 stores output image data 28 which is in the final and output form of synthesized image data 26 created by image synthesizing processing unit 18 which uses input image data 24 obtained from image data input unit 36. Parameters storage unit 12 stores motion data 30 which is the displacement between a reference image and a target image, pixel value differences data 32 which is the pixel value differences between each corresponding block of a reference image and a target image, and blending ratio data 34 which is the ratio of blending between a reference data and a comparison data as well as the ratio of blending for each corresponding block.

Figure 2:
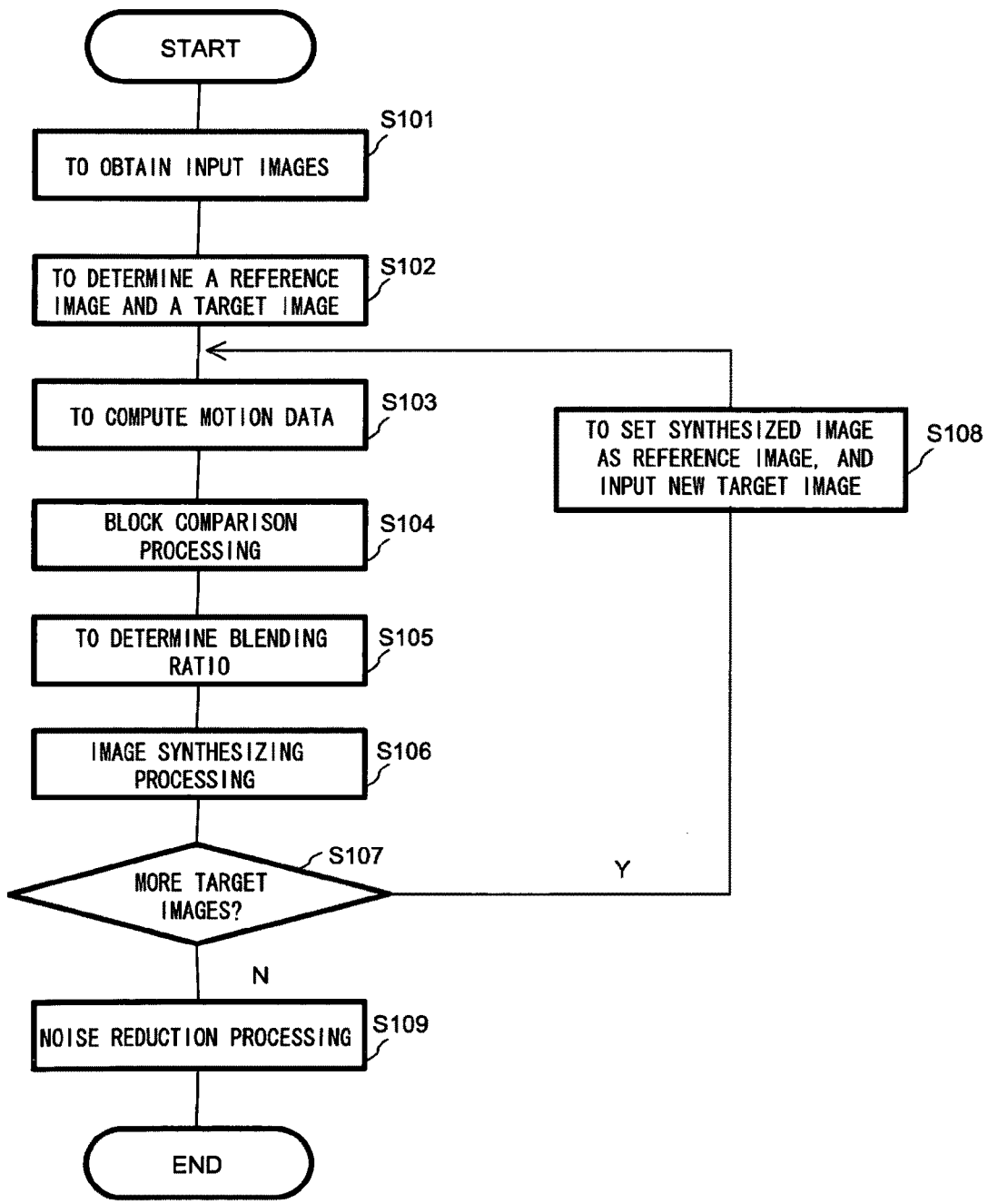
FIG. 2 is a flow chart of image data process for this embodiment of the present invention.

Next, actions taken by this embodiment of the image processing apparatus is described using the flowchart in FIG. 2.
<Step S101>

Figure 8:
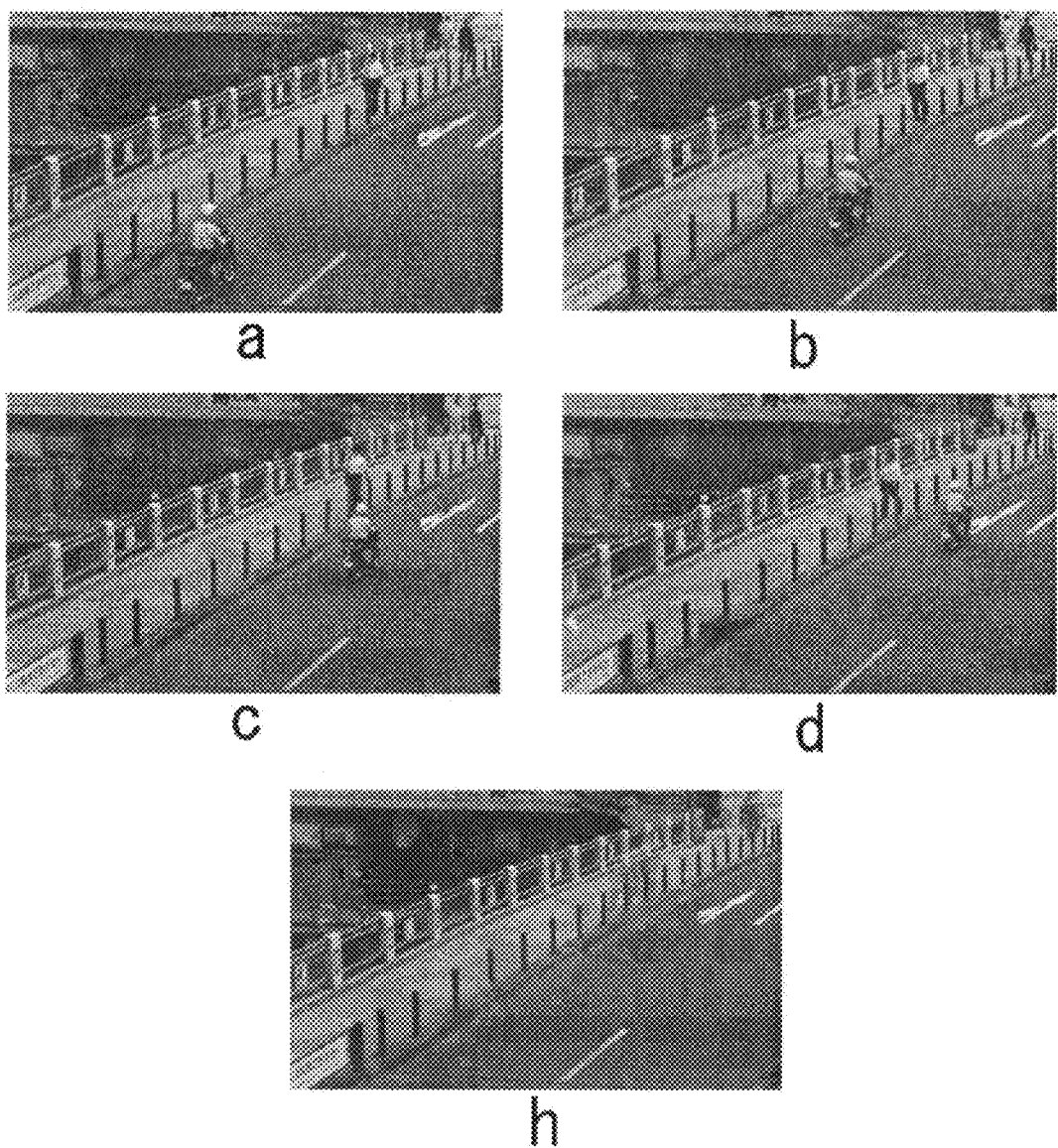
FIG. 8 is images describing image synthesizing with existing technology.

Image data input unit 36 obtains multiple images captured by an external imaging device, and then stores them in image data storage device 10. Input images are consecutively captured images, and in this embodiment, input images are described as being FIG. 8 (a) through (d).

\<Step S102\>

Motion data detection unit 38 makes one of the input images a reference image, and one of the remaining images a target image. In this embodiment, an image that was captured the earliest is used as a reference image, and the next earliest image is a target image. In the FIG. 8 example, the images are in chronological order from (a) to (d), therefore at this step (a) is the reference image and (b) is the target image.

\<Step S103\>

Motion data detection unit 38 computes motion data between a reference image and a target image. Motion data can be motion vectors indicating amount of parallel displacement such as relative displacement between a reference image and a target image as in FIG. 3 (*a*), or affine parameters with multi-degrees of freedom that are more capable of detecting motion such as rotational motion as in FIG. 3 (*b*). For example, Japanese Unexamined Patent Application Publication 2007-226643 describes a technology where after performing multi-resolution processing of an input image, block matching process is performed from the lowest resolution image to the highest, thus obtaining a highly accurate affine parameters, this technology can be utilized to compute the motion data between a reference image and a target image.

\<Step S104\>

Block comparison unit 40 adjusts the displacement between a reference image and a target image by using motion data obtained in Step S103, then divides each image into specific blocks, and then computes the difference of the sum of pixel values for each corresponding block. FIG. 4 indicates a state where a reference image and a target image are divided into blocks. Block A of the reference image corresponds to block B of the target image in the comparison data after adjusting the displacement according to the motion data. Here, the difference in the sums of each pixel value in block A and block B is calculated. For specific example of dividing into blocks, 16 by 16 pixel blocks are used to process images that are 200 megapixels to 500 megapixels in size. The block size can be altered depending on such factors as processing apparatus, necessary processing speed, and size of images.

The equation in this process, as follows, uses pixel values I(p) and I(q) where coordinate (p) is in block A and coordinate (q) is in block B.

$$\frac{\left| \sum_{p \in A} I(p) - \sum_{q \in B} I(q) \right|}{\sum_{p \in A} 1} \quad \text{[Equation 1]}$$

In order to reduce the amount of calculation needed to calculate the sum of the pixel values in a block, pixel skipping can be utilized in the calculation. This reduces the accuracy of the decisions made between blocks, but speeds up processing.

\<Step S105\>

Blending ratio computation unit 42 computes the blending ratio for each block of a target image onto a reference image based on the difference in pixel values per each block as computed in block comparison unit 40. The computed blending ratio is stored in parameters storage device 12 as blending ratio data for each block of each image (S105). In this embodiment, if the difference in total pixel values obtained in Step S104 is above a certain threshold, then no blending action of target image onto reference image will be performed for that block. At this time, the blending ratio for this block of the target image is 0. Therefore, for each pixel in this block, when creating the synthesized image, the pixel intensity values will be set as reference image 1 and target image 0.

Figure 5:
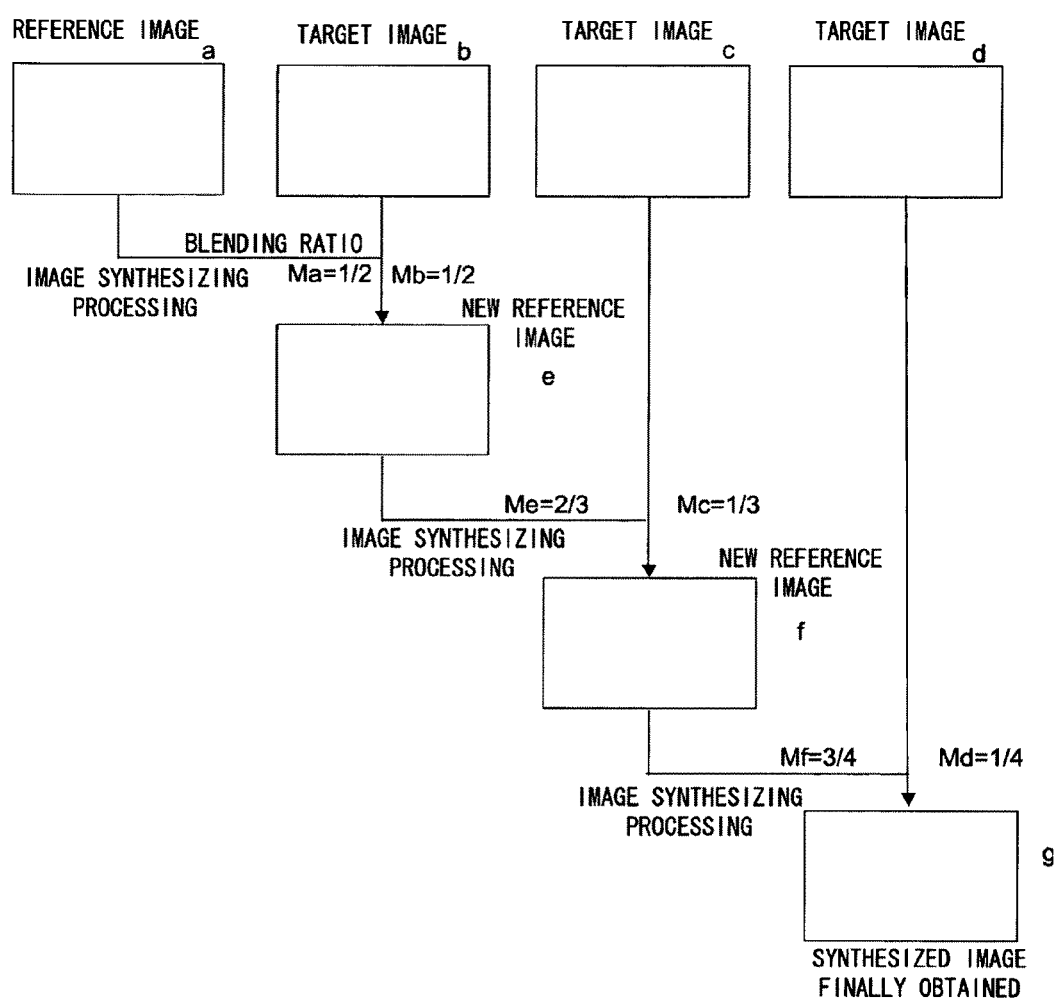
FIG. 5 is a diagram with an overview of the image synthesizing process for this embodiment of the present invention.

If the difference of pixel values is less than the threshold, blending ratio is determined so that the effect of each target image on a reference image is the same. FIG. 5 shows an example where the final synthesized image is created from 4 input images. In the first part of Step S105, image (a) is the reference image and image (b) is the target image and the blending ratio is determined for each corresponding block. At this point, if the difference in pixel values between the blocks being compared is less than the threshold, the synthesized image created (e) will be composed of image (a) and image (b) in 1:1 ratio, and the blending ratio for both image (a) and image (b) are 1/2 respectively.

Now, the required threshold value at this point should be able to determine whether the difference in sums of pixel values is not the result of noise but of change in subject captured in the block. In this embodiment, it is set at ⅛ of the maximum pixel value; however, this value is based on experience. For example, if each pixel is capable of 256 values, then the threshold will be set to 32. However, this is only one example, and an appropriate value should be selected depending on factors such as image capturing device.

Details will be described later, however if there is still a target image(s) remaining after creating a synthesized image, the synthesized image will become the new reference image, and a new synthesized image will be created with a new target image (S102 after S108).

\<S105 from the Second Iteration\>

In the case of FIG. 5, this refers to the process steps where image (e) and image (c) are synthesized together to obtain image (f) in the process, and also the synthesizing of image (f) and image (d) together to obtain image (g). When synthesizing image (e) and image (c) together, if the difference in pixel values for a specific block is above noted threshold, the impact of image (c)'s block should be equal to the impact of blocks from image (a) and image (b), therefore image (c)'s blending ratio will be set to 1/3 and image (e)'s blending ratio will be 2/3. Therefore, if the synthesized image used as the reference image is composed of N images (where N is a positive integer), then the blending ratio of the reference image is N/(N+1) and the blending ratio for the target image is 1/(N+1).

Other than the above computational method, blending ratio can be based on the difference of sums of pixel values.

For example, if the difference is 0, a reference image and a target image are set as 1:1 with each blending ratio being 1/2, and the blending ratio of a reference image can be computed to increase as the difference increases.

\<Blending Ratio Adjustment (S105)\>

When determining the blending ratio; and if a corresponding block in a target image for a block in a reference image does not exist, then do not perform the blending processing, and use the reference image block as the synthesized image block.

Figure 9:
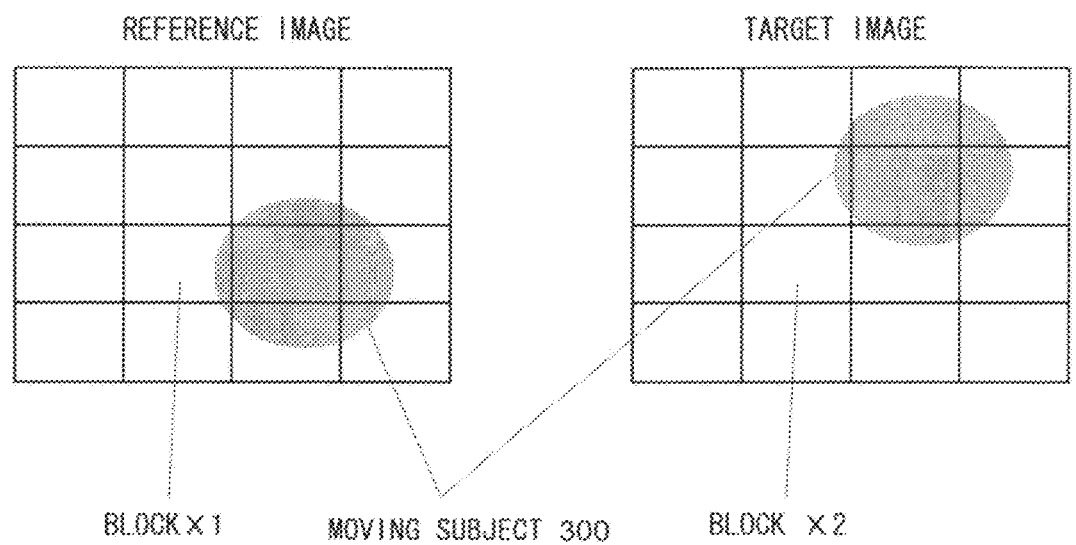
FIG. 9 is a diagram with a specific example of the adjustment process following the determination of blending ratio in Step S105.

Also, after determining blending ratios for all blocks, if there are any blocks whose blending ratio is set to 0, meaning target image will not be blended with reference image, then also set all immediately surrounding blocks' blending ratios to 0. This makes the synthesizing process more accurate for blocks that contain an edge of a moving subject. This is indicated in FIG. 9.

Block $X_1$ includes a part of the moving subject 300 within the reference image. Block $X_2$ in the target image corresponds to block $X_1$ in the reference image. For these blocks, if the difference in sum of pixel values is obtained using Step S104, since the moving subject's impact is small the difference will also be small. Therefore in Step S105, the blending ratio will be set to perform blending of the block's pixel values. At this time, the pixel values for a part of the moving subject in block $X_1$ will be set to synthesize with a weak value.

In the blending ratio adjustment of this embodiment, the block to the right of block $X_1$ will not be blending, therefore block $X_1$ will also not be blending, and this solves the issue of having one part of the moving subject synthesizing with a weak value.

<Step S106>

Image synthesizing unit 44 performs additions of reference image pixel values and corresponding target image pixel values for each reference image block weighing by the blending ratio determined in Step S105. Once the addition process has been completed for all blocks of the reference image, the synthesized image is created. Synthesized image is stored in image data storage device 10 as synthesized image data.

At this time, the method for creating a synthesized image considers the pixel value of coordinate (x, y) of synthesized image block A to be A (x, y), and considering the displacement between images, the corresponding pixels in target image block B are B(x+dx, y+dy), and further, the blending ratio of block B to block A is "α" which means the following.

$$A(x,y) = (1-\alpha)A(x,y) + \alpha B(x+dx, y+dy)$$ [Equation 2]

Now, in the above example, the displacement between block A and block B is calculated as a vector (dx, dy), but this can also be calculated using affine parameters.

<Steps S107 and S108>

After the creation of a synthesized image, image synthesizing processing unit 18 refers to image data storage device 10 to check whether there are remaining target images (S107). If there is a new target image (Y in S107), image synthesizing processing unit 18 uses the synthesized image created in Step S106 as a new reference image, and selects input image data not yet used for image synthesizing as a new target image, and starts the image synthesizing process with these two images (S108).

FIG. 5 is an example that shows the outline of processing of Step S101 to Step 108 in this embodiment, where the diagram describes how 1 reference image and 3 target images are used to create the final synthesized image. In FIG. 5, Mx(x:a-f) is the blending ratio of image (x). By performing Step S101 to Step S106 on reference image (a) and target image (b), synthesized image (e) is obtained. Step S107 determines whether there are any more target images available. Since a target image is available, in Step S108, synthesized image (e) becomes a new reference image with respect to a new target image (c) and the process is resumed at Step S103. By repeating the process from Step S103 to Step S106, a new synthesized image (f) is obtained. Step S107 repeats until it is determined that there are no more target images available, thereby finally obtaining synthesized image (g).

<Step S109>

Noise reduction unit 20 sets a noise reduction coefficient based on the number of images used to synthesize each block and performs a noise reduction filtering process (S109). Existing technology is used as a noise reduction method. For example, known noise reduction methods include bilateral filter, Gaussian filter, and median filter.

When deciding on the noise reduction coefficient, if the number of images used in synthesizing the image is large, reduce the noise reduction coefficient so that noise reduction filter's effect is weak. If the number of images used is small, then use a large noise reduction coefficient so that the noise reduction filter's effect is strong.

An example will be described where a bilateral filter is used in this embodiment. Bilateral filters weigh pixels based on their proximity and intensity when compared to a central pixel. The weighing by distance and pixel value is generally performed using Gaussian distribution. Central pixel is (p), reference pixel is (q), reference pixel collection is A, pixel values are I(p) and I(q), then the weight function w(p, q) based on intensity will be as follows.

$$w(p,q) = \frac{e^{-\frac{(I(p)-I(q))+\|q-p\|^2}{2\pi\sigma_d^2}}}{\sum_{q \in A} e^{-\frac{(I(p)-I(q))+\|q-p\|^2}{2\pi\sigma_d^2}}}$$ [Equation 3]

In this weight function w(p, q), coefficient $\sigma_d$ can be altered to change the strength of the filter. By increasing noise reduction coefficient $\sigma_d$ the filtering becomes stronger.

In Step S109, this coefficient $\sigma_d$ is altered depending on the number of images synthesized together, which alters the strength of the filter. Suppose a coefficient about a block of 1 image blending be σ and if there are 2 or 3 images blending, then the coefficient is set as σ/2 or σ/3 respectively. This reduces the effect of the filter on blocks that have many images blended together, and reduces the dispersal effect of the difference in intensity.

Also, noise reduction coefficients can be determined depending on the impact each image has on the final synthesized image. The impact of each block of each image is the product of blending ratios of each synthesizing process. In the FIG. 5 example, the blending ratio for image (a) to create image (e) is expressed as $M_a$, and similarly blending ratios for image (e) and image (f) are expressed as $M_e$ and $M_f$, and the blending ratio of image (a) in the final synthesized image (g) $M_{ga}$ is the product of $M_a$, $M_e$, and $M_f$. Similarly obtain values for image (b), image (c), and image (d). When there are N input images, noise reduction coefficient could be determined by the number of images that have blending ratios above the threshold value (for example 1/N).

With this process, the random noise distribution in the final synthesized image is resolved, and overall, a smoother and less noisy image can be obtained. Digital images contain random noise, and when images are synthesized together, the noise is averaged out and the noise level is decreased. In this embodiment, the blending ratio differs depending on the block, and in a block with a moving subject, its pixel value differs greatly from that of the target images, and the blending ratio between the reference image and the target image becomes small. Therefore, the final synthesized image will have blocks with much noise and blocks with less noise and the difference in noise level between blocks will become apparent. Therefore, the noise reduction coefficient is changed from block to block to apply the filter which will equalize the overall distribution of noise, thus obtaining a more natural image. Now, for blocks that have experienced the noise reduction due to image synthesizing, applying noise reduction filter on them may deteriorate the image quality, so the noise reduction filter is weakly applied or not applied at all.

Figure 6:
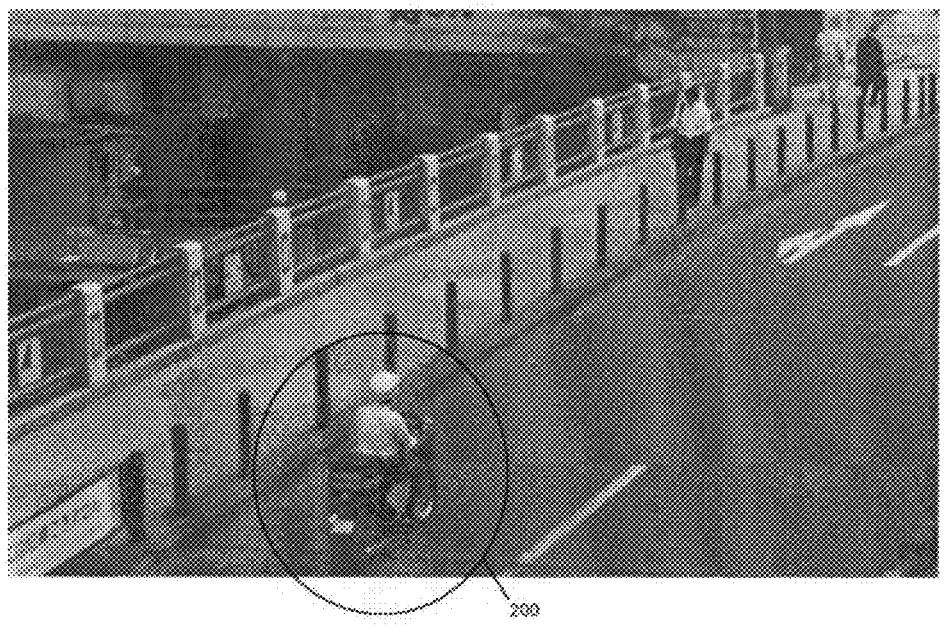
FIG. 6 is a synthesized image before the noise reduction process.

FIG. 6 is the synthesized image of image (a) through image (d) before the noise reduction process has been applied. The area surrounding the motorbike, the moving subject 200, has high levels of noise. In areas where this noise is prevalent, the noise reduction coefficient is increased in the noise reduction process.

Figure 7:
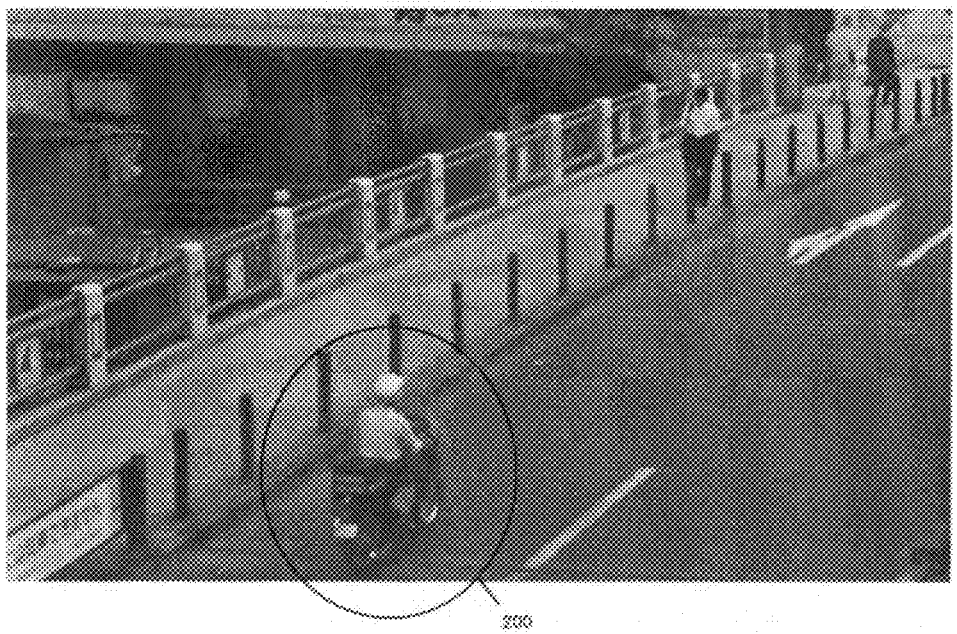
FIG. 7 is a synthesized image after the noise reduction process.

FIG. 7 is the result of FIG. 6 after Step S109 noise reduction process. Compared to FIG. 6, it can be seen that noise has been reduced in area 200.

Noise reduction unit 20 stores the synthesized image obtained using the above process as blur-compensated image, which is the output data, in image data storage device 10. Image data output unit 22 outputs the output image data to an external device such as a display device or a memory device.

According to this embodiment, when performing blur-compensated image synthesizing, the difference in pixel values between each image for their corresponding blocks is obtained and blocks that probably contain moving subjects are identified, and during the image synthesizing process these blocks are not blended in, which makes it possible to perform image synthesizing while not being affected by moving subjects. Further, by applying strong noise reduction on blocks that had small effect from image blending or blocks that do not have any blending, the noise level in that block is reduced, and an overall noise reduction balanced image can be obtained.

OTHER EMBODIMENTS

A second embodiment is described here. In the first embodiment, a reference image is compared to a target image while consecutively obtaining the next target image. In this second embodiment, Step S102 to Step S106 processes for all images are performed at the same time to create a synthesized image. Step S109 is performed afterwards as a noise reduction process.

Figure 10:
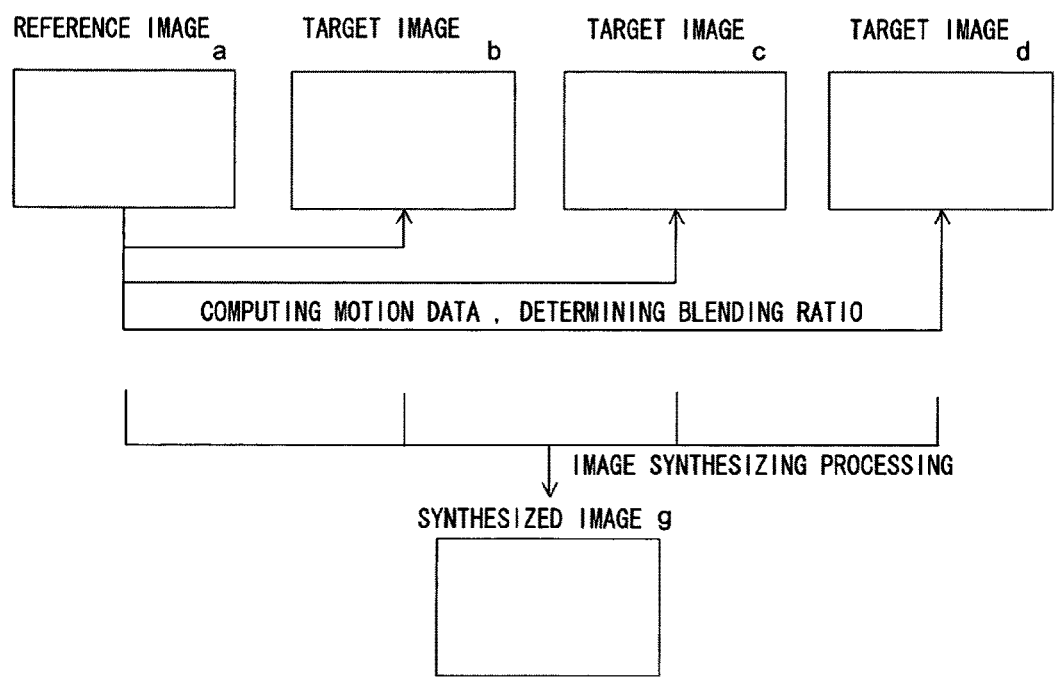
FIG. 10 is a diagram with an overview of the image synthesizing process for the second embodiment of the present invention.

FIG. 10 is a figure indicating the processing outline of this embodiment. This example shows reference image (a) and target images (b)-(d) in the synthesizing process. For each reference image and target image pair, Step S103 to Step S105 are performed, and for each block of each image the blending ratio is determined. After determining the blending ratios, each image's corresponding pixel values are weighed by its blending ratio and added to synthesize the image. Following the creation of the synthesized image, the noise reduction process is conducted in the same manner as in the first embodiment.

With this process, more memory is required when compared to the first embodiment, but since each target image is compared with the reference image to determine their motion data and blending ratio, the synthesized image will more closely reflect the reference image.

Now, the present invention shall not be restricted to the above embodiments, and can be applied to various forms without departing from its main purpose. For example, this can be processed over a communication network connected to a computing device, etc. with which image data and motion data transfers can be conducted.

The image data processing method of the present invention can be applied to blur-compensation device on a computer, image processing apparatus for image synthesizing, imaging devices such as digital cameras and video cameras, and moving image playback devices.

What is claimed is:

1. An image data processing method including:
    a motion data computation process for calculating the motion data between a reference image and a target image;
    a block comparison process for adjusting displacement between the reference image and the target image by using the motion data, dividing the reference image and the target image into blocks, and calculating difference in pixel value between the reference image and the target image for every block;
    a blending ratio calculation process for calculating, based on the difference in pixel value, the blending ratio between the reference image and the target image for each block;
    an image synthesizing process for creating a synthesized image by synthesizing the reference image and the target image according to the motion data and the blending ratio; and
    a noise reduction process for applying a noise reduction filter in the obtained synthesized image so as to change the coefficient for every block depending on the number of images synthesized together;
    wherein, when the difference in the pixel value exceeds a predetermined threshold, the blending ratio is set to 0;
    whereby prevents a photographic subject from becoming indistinct even if there is a moving subject in a captured image and obtains a blur-compensated image.

2. The image data processing method according to claim 1, further including the following steps after the image synthesizing process:
    obtaining a new target image;
    setting the synthesized image created by the image synthesizing process as a new reference image; and
    repeating the motion data computation process, the block comparison process, the blending ratio calculation process, and the image synthesizing process successively to create a final synthesized image.

3. An image processing apparatus comprising:
    a motion data computation means for calculating the motion data between a reference image and a target image;
    a block comparison means for adjusting displacement between the reference image and the target image by using the motion data, dividing the reference image and the target image into blocks, and calculating difference in pixel value between the reference image and the target image for every block;
    a blending ratio calculation means for calculating, based on the difference in pixel value, the blending ratio between the reference image and the target image for each block;
    an image synthesizing means for creating a synthesized image by synthesizing the reference image and the target image according to the motion data and the blending ratio; and
    a noise reduction means for applying a noise reduction filter in the obtained synthesized image so as to change the coefficient for every block depending on the number of images synthesized together;
    wherein, when the difference in the pixel value exceeds a predetermined threshold, the blending ratio is set to 0;
    whereby prevents a photographic subject from becoming indistinct even if there is a moving subject in a captured image and obtains a blur-compensated image.

* * * * *